US012803055B2

(12) United States Patent
Cho et al.

(10) Patent No.: US 12,803,055 B2
(45) Date of Patent: Nov. 17, 2026

(54) NON-AQUEOUS ELECTROLYTE AND LITHIUM SECONDARY BATTERY INCLUDING THE SAME

(71) Applicant: LG Energy Solution, Ltd., Seoul (KR)

(72) Inventors: Yoon Gyo Cho, Daejeon (KR); Sung Guk Park, Daejeon (KR); Jeong Woo Oh, Daejeon (KR); Chul Haeng Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 423 days.

(21) Appl. No.: 18/701,700

(22) PCT Filed: May 16, 2023

(86) PCT No.: PCT/KR2023/006619
§ 371 (c)(1),
(2) Date: Apr. 16, 2024

(87) PCT Pub. No.: WO2023/224361
PCT Pub. Date: Nov. 23, 2023

(65) Prior Publication Data

US 2025/0006998 A1 Jan. 2, 2025

(30) Foreign Application Priority Data

May 16, 2022 (KR) ........................ 10-2022-0059547

(51) Int. Cl.
*H01M 10/0569* (2010.01)
*H01M 4/02* (2006.01)
*H01M 4/38* (2006.01)

(52) U.S. Cl.
CPC ....... *H01M 10/0569* (2013.01); *H01M 4/386* (2013.01); *H01M 2004/027* (2013.01)

(58) Field of Classification Search
CPC ............. H01M 10/0569; H01M 4/386; H01M 2004/027
See application file for complete search history.

(56) References Cited

U.S. PATENT DOCUMENTS

| | | | | |
|---|---|---|---|---|
| 2002/0195591 A1 | | 12/2002 | Ravet et al. | |
| 2004/0140458 A1 | | 7/2004 | Ravet et al. | |
| 2006/0060827 A1 | | 3/2006 | Ravet et al. | |
| 2008/0257721 A1 | | 10/2008 | Ravet et al. | |
| 2011/0008680 A1 | | 1/2011 | Muldoon et al. | |
| 2012/0219866 A1 | * | 8/2012 | Onuki | H01M 10/056 429/200 |
| 2018/0062205 A1 | * | 3/2018 | Takechi | H01M 10/0525 |
| 2020/0251781 A1 | | 8/2020 | Su et al. | |
| 2025/0006998 A1 | * | 1/2025 | Cho | H01M 10/0525 |

FOREIGN PATENT DOCUMENTS

| | | | | | |
|---|---|---|---|---|---|
| CA | 2321373 | A1 | * | 3/2001 | H01M 10/0525 |
| CN | 113764728 | A | * | 12/2021 | H01M 10/0567 |
| JP | 2001243979 | A | | 9/2001 | |
| JP | 2004175668 | A | | 6/2004 | |
| JP | 2012531714 | A | | 12/2012 | |
| JP | 2015088492 | A | | 5/2015 | |
| JP | 2016186915 | A | | 10/2016 | |
| KR | 20010067251 | A | | 7/2001 | |
| KR | 20050066166 | A | | 6/2005 | |
| KR | 20190024104 | A | | 3/2019 | |

OTHER PUBLICATIONS

Machine Translation of CN-113764728-A (Aug. 7, 2026) (Year: 2026).*
Extended European Search Report including Written Opinion for Application No. 23807880.2 dated Aug. 28, 2024, pp. 1-9.
International Search Report for Application No. PCT/KR2023/006619 dated Aug. 17, 2023, 2 pages.

* cited by examiner

*Primary Examiner* — Matthew J Merkling
(74) *Attorney, Agent, or Firm* — Lerner David LLP

(57) ABSTRACT

Provided is a non-aqueous electrolyte including a lithium salt and an organic solvent, wherein the organic solvent includes a compound represented by Formula 1 in an amount of 25 wt % to 80 wt % based on the total non-aqueous electrolyte:

[Formula 1]

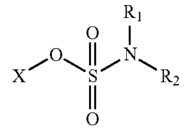

wherein, in Formula 1, $R_1$ and $R_2$ may each independently be any one selected from the group consisting of hydrogen (H), an alkyl group having 1 to 10 carbon atoms, an alkenyl group having 2 to 10 carbon atoms, an alkynyl group having 2 to 10 carbon atoms, a cycloalkyl group having 3 to 12 carbon atoms, a cycloalkenyl group having 3 to 12 carbon atoms, and an aryl group having 6 to 20 carbon atoms, and X may be a perfluoroalkyl group having 1 to 5 carbon atoms.

13 Claims, No Drawings

NON-AQUEOUS ELECTROLYTE AND LITHIUM SECONDARY BATTERY INCLUDING THE SAME

CROSS-REFERENCE TO RELATED APPLICATIONS

This application is a national stage entry under 35 U.S.C. § 371 of International Application No. PCT/KR2023/006619 filed on May 16, 2023, which claims priority from Korean Patent Application No. 10-2022-0059547, filed on May 16, 2022, the disclosures of which are incorporated by reference herein.

TECHNICAL FIELD

The present disclosure relates to a non-aqueous electrolyte and a lithium secondary battery including the same.

BACKGROUND ART

Recently, demand for a secondary battery having high stability as well as high capacity and high output is increasing as an application area of lithium secondary batteries is rapidly expanding not only to electricity, electronics, communication, and power supply of electronic devices such as computers, but also to power storage supply of automobiles or large-area devices such as power storage devices.

Particularly, high capacity, high output, and long-term life characteristics are becoming important in lithium secondary batteries for automotive applications. In order to increase capacity of the secondary battery, a nickel-rich positive electrode active material having high energy density but low stability may be used, or the secondary battery may be operated at a high voltage.

However, in a case in which the secondary battery is operated under the above conditions, transition metal ions may be dissolved from a surface of a positive electrode while an electrode surface structure or a film formed on the surface of the positive/negative electrode is degraded due to a side reaction caused by degradation of an electrolyte as charge and discharge proceed. As described above, since the dissolved transition metal ions degrade passivation ability of a solid electrolyte interphase (SEI) while being electrodeposited on the negative electrode, there occurs a problem in that the negative electrode is degraded.

This degradation phenomenon of the secondary battery tends to be accelerated when a potential of the positive electrode is increased or when the battery is exposed to a high temperature.

Also, a so-called swelling phenomenon, in which gas is generated to increase a thickness of the battery if a lithium ion battery is continuously used for a long time or is left standing at a high temperature, occurs, wherein it is known that an amount of the gas generated in this case depends on a state of the SEI.

Thus, in order to solve this problem, research and development on a method capable of reducing the swelling phenomenon of the secondary battery and increasing stability at high temperatures by inhibiting the dissolution of the metal ions from the positive electrode and forming a stable SEI film on the negative electrode are being attempted.

Technical Problem

An aspect of the present invention provides a non-aqueous electrolyte including an organic solvent for a non-aqueous electrolyte which may suppress degradation of a positive electrode, may reduce a side reaction between the positive electrode and the electrolyte, and may form a stable solid electrolyte interphase (SEI) film on a negative electrode.

Another aspect of the present invention provides a lithium secondary battery in which overall performance is improved by improving high-temperature cycle characteristics and high-temperature storage characteristics by including the above non-aqueous electrolyte.

Technical Solution

According to an embodiment, in order to achieve the above object, the present invention provides a non-aqueous electrolyte including a lithium salt and an organic solvent. The non-aqueous electrolyte of the present disclosure includes a compound represented by Formula 1 below as the organic solvent, and includes the compound represented by Formula 1 in an amount of 25 wt % to 80 wt % based on the total non-aqueous electrolyte.

[Formula 1]

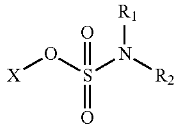

wherein, in Formula 1, $R_1$ and $R_2$ are each independently any one selected from the group consisting of hydrogen (H), an alkyl group having 1 to 10 carbon atoms, an alkenyl group having 2 to 10 carbon atoms, an alkynyl group having 2 to 10 carbon atoms, a cycloalkyl group having 3 to 12 carbon atoms, a cycloalkenyl group having 3 to 12 carbon atoms, and an aryl group having 6 to 20 carbon atoms, and X may be a perfluoroalkyl group having 1 to 5 carbon atoms.

According to another embodiment, the present invention provides a lithium secondary battery including the non-aqueous electrolyte.

Advantageous Effects

A non-aqueous electrolyte of the present disclosure includes the compound represented by Formula 1 as an organic solvent. Since the compound represented by Formula 1 has a sulfonamide group, it is thermally unstable, minimizes formation of an organic material film derived from carbonate with high electrolyte solution permeability, and suppresses generation of oxidizing gas, and thus, a side reaction between a positive electrode and the electrolyte at high voltage occurs less. As a result, since the non-aqueous electrolyte of the present disclosure may suppress degradation of the positive electrode and may reduce the side reaction between the positive electrode and the electrolyte, it has an effect of a lower gas generation amount. Particularly, this effect is further maximized when exposed to high temperatures.

Also, in the compound represented by Formula 1, a perfluoroalkyl group is not directly connected to a sulfur atom of a sulfonamide group, but the perfluoroalkyl group is connected through an oxygen atom. Due to these characteristics, —$CF_3$ at an end is easily reduced to a form of LiF. That is, since the compound represented by Formula 1 may form a polymer-inorganic material film rich in inorganic material such as LiF, degradation of a negative electrode due to an interfacial reaction is suppressed.

Since the compound represented by Formula 1 has excellent interaction with anions present in the electrolyte, it has excellent anion solvation ability. Accordingly, since the compound represented by Formula 1 may increase an amount of an $F^-$-based inorganic material film on the negative electrode, it may form a stable SEI (Solid Electrolyte Interphase) film on a surface of the negative electrode. Thus, since degradation of the negative electrode may be prevented by suppressing a decrease in passivation ability of the SEI at high temperatures, life characteristics of a battery may be improved.

Therefore, since an electrode-electrolyte interface, which has low resistance and is stable even at high temperatures, may be formed and there is less gas generation at high temperatures if the non-aqueous electrolyte of the present disclosure including the compound represented by Formula 1 as the organic solvent is used, a lithium secondary battery, in which overall performance is improved by improving high-temperature cycle characteristics and high-temperature storage characteristics, may be achieved.

DETAILED DESCRIPTION

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

It will be further understood that the terms "include," "comprise," or "have" in this specification specify the presence of stated features, numbers, steps, elements, or combinations thereof, but do not preclude the presence or addition of one or more other features, numbers, steps, elements, or combinations thereof.

Before describing the present disclosure, unless otherwise specified in the present disclosure, the expression "*" denotes the same or different atom or a portion connected between ends of a formula.

Also, the expressions "a" and "b" in the description of "a to b carbon atoms" in the present specification each denote the number of carbon atoms included in a specific functional group. That is, the functional group may include "a" to "b" carbon atoms. For example, the expression "alkylene group having 1 to 5 carbon atoms" denotes an alkylene group including 1 to 5 carbon atoms, that is, $—CH_2—$, $—CH_2CH_2—$, $—CH_2CH_2CH_2—$, $—CH_2(CH_3)CH—$, $—CH(CH_3)CH_2—$, and $—CH(CH_3)CH_2CH_2—$.

Furthermore, in the present specification, the expression "alkylene group" denotes a branched or unbranched divalent saturated hydrocarbon group.

Also, an alkyl group or alkylene group in the present specification may all be substituted or unsubstituted. Unless otherwise defined, the expression "substitution" denotes that at least one hydrogen bonded to carbon is substituted with an element other than hydrogen, for example, an alkyl group having 1 to 20 carbon atoms, an alkenyl group having 2 to 20 carbon atoms, an alkynyl group having 2 to 20 carbon atoms, an alkoxy group having 1 to 20 carbon atoms, a cycloalkyl group having 3 to 12 carbon atoms, a cycloalkenyl group having 3 to 12 carbon atoms, a heterocycloalkyl group having 3 to 12 carbon atoms, a heterocycloalkenyl group having 3 to 12 carbon atoms, an aryloxy group having 6 to 12 carbon atoms, a halogen atom, a fluoroalkyl group having 1 to 20 carbon atoms, a nitro group, an aryl group having 6 to 20 carbon atoms, a heteroaryl group having 2 to 20 carbon atoms, or a haloaryl group having 6 to 20 carbon atoms.

Hereinafter, the present invention will be described in more detail.

Non-Aqueous Electrolyte

A non-aqueous electrolyte of the present disclosure includes a lithium salt and an organic solvent, and includes a compound represented by Formula 1 below as the organic solvent.

[Formula 1]

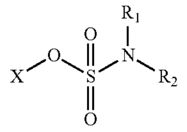

In Formula 1, $R_1$ and $R_2$ may each independently be any one selected from the group consisting of hydrogen (H), an alkyl group having 1 to 10 carbon atoms, an alkenyl group having 2 to 10 carbon atoms, an alkynyl group having 2 to 10 carbon atoms, a cycloalkyl group having 3 to 12 carbon atoms, a cycloalkenyl group having 3 to 12 carbon atoms, and an aryl group having 6 to 20 carbon atoms. Preferably, $R_1$ and $R_2$ may each independently be an alkyl group having 1 to 5 carbon atoms. Since ability to solvate lithium ion as the organic solvent is high in a case in which a substituent with less steric hindrance is present on a sulfonamide group, it may be more preferable.

In Formula 1, X may be a perfluoroalkyl group having 1 to 5 carbon atoms, and preferably, X may be $CF_3$ or $CF_2CF_3$.

Specifically, the compound of Formula 1 may be any one selected from the group consisting of compounds of Formulae 1a to 1f below, but is not limited thereto.

[Formula 1a]

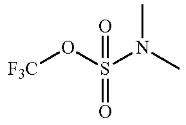

[Formula 1b]

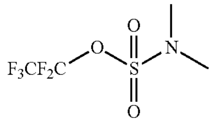

[Formula 1c]

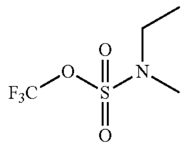

[Formula 1d]

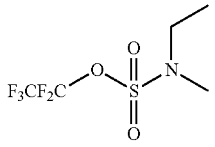

-continued

[Formula 1e]

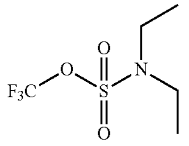

[Formula 1f]

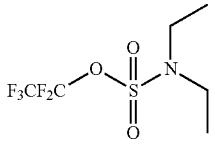

The compound represented by Formula 1 may be included in an amount of 25 wt % to 80 wt %, preferably 25 wt % to 60 wt %, and most preferably 30 wt % to 40 wt % based on the total non-aqueous electrolyte. In a case in which the above range is satisfied, since a sufficiently robust film may be formed on the negative electrode, a lithium secondary battery having improved high-temperature life characteristics and high-temperature storage characteristics may be provided. Particularly, in a case in which the compound represented by Formula 1 is included in an amount of less than 25 wt % based on the total non-aqueous electrolyte, since a film containing a sufficient LiF inorganic material may not be formed on the negative electrode, there is a problem in that high-temperature cycle and high-temperature storage characteristics are insufficient.

The compound represented by Formula 1 may be included in an amount of 10 vol % to 50 vol %, preferably 10 vol % to 40 vol %, and most preferably 15 vol % to 35 vol % based on a total volume of the organic solvent. In a case in which all or part of a cyclic carbonate organic solvent used in a conventional non-aqueous electrolyte is replaced with the compound represented by Formula 1, it may solve a problem that a cyclic carbonate is exposed to a high voltage to generate a large amount of gas.

The non-aqueous electrolyte of the present disclosure may include at least one of a cyclic carbonate-based organic solvent, a linear carbonate-based organic solvent, a linear ester-based organic solvent, or a cyclic ester-based organic solvent as the non-aqueous organic solvent, in addition to the compound represented by Formula 1. Preferably, the non-aqueous electrolyte of the present disclosure may further include the compound represented by Formula 1 and a linear carbonate-based organic solvent as the organic solvent.

The linear carbonate-based organic solvent is an organic solvent having low viscosity and low permittivity, wherein typical examples of the linear carbonate-based organic solvent may be at least one organic solvent selected from the group consisting of dimethyl carbonate (DMC), diethyl carbonate (DEC), dipropyl carbonate, ethyl methyl carbonate (EMC), methylpropyl carbonate, and ethylpropyl carbonate, and the linear carbonate-based organic solvent may specifically include diethyl carbonate (DEC).

The cyclic carbonate-based organic solvent is an organic solvent which may well dissociate the lithium salt in the electrolyte due to high permittivity as a highly viscous organic solvent, wherein specific examples of the cyclic carbonate-based organic solvent may be at least one organic solvent selected from the group consisting of ethylene carbonate (EC), propylene carbonate (PC), fluoroethylene carbonate (FEC), 1,2-butylene carbonate, 2,3-butylene carbonate, 1,2-pentylene carbonate, 2,3-pentylene carbonate, and vinylene carbonate.

Also, the organic solvent may further include at least one of a linear ester-based organic solvent or a cyclic ester-based organic solvent to prepare an electrolyte having high ionic conductivity.

Specific examples of the linear ester-based organic solvent may be at least one organic solvent selected from the group consisting of methyl acetate, ethyl acetate, propyl acetate, methyl propionate, ethyl propionate, propyl propionate, and butyl propionate.

Also, the cyclic ester-based organic solvent may include at least one of γ-butyrolactone, γ-valerolactone, γ-caprolactone, σ-valerolactone, or ε-caprolactone.

The organic solvent may be used by adding an organic solvent typically used in a non-aqueous electrolyte without limitation, if necessary. For example, the organic solvent may further include at least one of an ether-based organic solvent, a glyme-based solvent, or a nitrile-based organic solvent.

As the ether-based solvent, any one selected from the group consisting of dimethyl ether, diethyl ether, dipropyl ether, methylethyl ether, methylpropyl ether, ethylpropyl ether, 1,3-dioxolane (DOL), and 2,2-bis(trifluoromethyl)-1,3-dioxolane (TFDOL) or a mixture of two or more thereof may be used, but the ether-based solvent is not limited thereto.

The glyme-based solvent is a solvent having higher permittivity and lower surface tension than the linear carbonate-based organic solvent as well as less reactivity with metal, wherein the glyme-based solvent may include at least one of dimethoxyethane (glyme, DME), diethoxyethane, diglyme, tri-glyme (Triglyme), or tetra-glyme (TEGDME), but is not limited thereto.

The nitrile-based solvent may be at least one selected from the group consisting of acetonitrile, propionitrile, butyronitrile, valeronitrile, caprylontrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, and 4-fluorophenylacetonitrile, but is not limited thereto.

The lithium salt included in the non-aqueous electrolyte of the present disclosure is used as an electrolyte salt in a lithium secondary battery, wherein it is used as a medium for transferring ions. Typically, the lithium salt, for example, may include $Li^+$ as a cation, and may include at least one of $F^-$, $Cl^-$, $Br^-$, $I^-$, $NO_3^-$, $N(CN)_2^-$, $BF_4^-$, $ClO_4^-$, $BioCl_{10}^-$, $AlCl_4^-$, $AlO_2^-$, $PF_6^-$, $CF_3SO_3^-$, $CH_3CO_2^-$, $CF_3CO_2^-$, $AsF_6^-$, $SbF_6^-$, $CH_3SO_3^-$, $(CF_3CF_2SO_2)_2N^-$, $(CF_3SO_2)_2N^-$, $(FSO_2)_2N^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)$ $PF^-$, $(CF_3)$ $P^-$, $C_4F_9SO_3^-$, $CF_3CF_2SO_3^-$, $CF_3CF_2$ $(CF_3)_2CO^-$, $(CF_3$ $SO_2)_2CH^-$, $CF_3$ $(CF_2)_7SO_3^-$, or $SCN^-$ as an anion.

Specifically, the lithium salt may include a single material selected from the group consisting of LiCl, LiBr, LiI, $LiBF_4$, $LiClO_4$, $LiB_{10}Cl_{10}$, $LiAlCl_4$, $LiAlO_2$, $LiPF_6$, $LiCF_3SO_3$, $LiCH_3CO_2$, $LiCF_3CO_2$, $LiAsF_6$, $LiSbF_6$, $LiCH_3SO_3$, LiFSI (lithium bis(fluorosulfonyl) imide, $LiN(SO_2F)_2$), LiBETI (lithium bis(perfluoroethanesulfonyl) imide, $LiN(SO_2CF_2CF_3)_2$), and LiTFSI (lithium bis(trifluoromethanesulfonyl) imide, $LiN(SO_2CF_3)_2$) or a mixture of two or more thereof. In addition to these materials, a lithium salt typically used in an electrolyte of a lithium secondary battery may be used without limitation.

The lithium salt may be appropriately changed in a normally usable range, but may be included in a concentration of 0.1 M to 5.0 M, preferably 0.5 M to 3.0 M, and more preferably 1.0 M to 2.0 M in the electrolyte to obtain an optimum effect of forming a film for preventing corrosion of the surface of the electrode. In a case in which the concentration of the lithium salt satisfies the above range, since an effect of improving cycle characteristics during high-temperature storage of the lithium secondary battery is sufficient and viscosity of the non-aqueous electrolyte is appropriate, electrolyte impregnability may be improved.

Also, the non-aqueous electrolyte of the present disclosure may further include a known electrolyte additive in the non-aqueous electrolyte, if necessary, in order to prevent the occurrence of collapse of the negative electrode due to decomposition of the non-aqueous electrolyte in a high output environment or to further improve low-temperature high rate discharge characteristics, high-temperature stability, overcharge prevention, and an effect of suppressing battery swelling at high temperature.

Typical examples of the other electrolyte additives may include at least one additive for forming a SEI film which is selected from the group consisting of a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, and a lithium salt-based compound.

The cyclic carbonate-based compound may include vinylene carbonate (VC) or vinyl ethylene carbonate.

The halogen-substituted carbonate-based compound may include fluoroethylene carbonate (FEC).

The sultone-based compound may include at least one of 1,3-propane sultone (PS), 1,4-butane sultone, ethane sultone, 1,3-propene sultone (PRS), 1,4-butene sultone, or 1-methyl-1,3-propene sultone.

The sulfate-based compound may include ethylene sulfate (Esa), trimethylene sulfate (TMS), or methyl trimethylene sulfate (MTMS).

The phosphate-based compound may include at least one of lithium difluoro (bisoxalato)phosphate, lithium difluorophosphate, tetramethyl trimethyl silyl phosphate, trimethyl silyl phosphite, tris(2,2,2-trifluoroethyl)phosphate, or tris (trifluoroethyl)phosphite.

The borate-based compound may include tetraphenylborate, lithium oxalyldifluoroborate (LiODFB), or lithium bis (oxalato) borate ($LiB(C_2O_4)_2$, LiBOB).

The nitrile-based compound may include at least one of succinonitrile, adiponitrile, acetonitrile, propionitrile, butyronitrile, valeronitrile, caprylonitrile, heptanenitrile, cyclopentane carbonitrile, cyclohexane carbonitrile, 2-fluorobenzonitrile, 4-fluorobenzonitrile, difluorobenzonitrile, trifluorobenzonitrile, phenylacetonitrile, 2-fluorophenylacetonitrile, or 4-fluorophenylacetonitrile.

The benzene-based compound may include fluorobenzene, the amine-based compound may include triethanolamine or ethylenediamine, and the silane-based compound may include tetravinylsilane.

The lithium salt-based compound is a compound different from the lithium salt included in the non-aqueous electrolyte, wherein the lithium salt-based compound may include lithium difluorophosphate (LiDFP), $LiPO_2F_2$, or $LiBF_4$.

In a case in which, among these other electrolyte additives, a combination of vinylene carbonate (VC), 1,3-propane sultone (PS), and ethylene sulfate (Esa) is additionally included, a more robust SEI film may be formed on the surface of the negative electrode during an initial activation process of the secondary battery, and high-temperature stability of the secondary battery may be improved by suppressing generation of a gas which may be generated due to the decomposition of the electrolyte at high temperature.

Two or more other electrolyte additives may be mixed and used, and the other electrolyte additives may be included in an amount of 0.1 wt % to 10 wt %, particularly 0.2 wt % to 8 wt %, and preferably 0.5 wt % to 8 wt % based on a total weight of the non-aqueous electrolyte. When the amount of the other electrolyte additives satisfies the above range, an effect of improving ionic conductivity and cycle characteristics is more excellent.

Lithium Secondary Battery

The present disclosure also provides a lithium secondary battery including the non-aqueous electrolyte.

Specifically, the lithium secondary battery includes a positive electrode including a positive electrode active material, a negative electrode including a negative electrode active material, a separator disposed between the positive electrode and the negative electrode, and the above-described non-aqueous electrolyte.

In this case, the lithium secondary battery of the present disclosure may be prepared according to a typical method known in the art. For example, after an electrode assembly is formed by sequentially stacking a positive electrode, a negative electrode, and a separator between the positive electrode and the negative electrode, the electrode assembly is inserted into a battery case, and the lithium secondary battery of the present disclosure may be prepared by injecting the non-aqueous electrolyte according to the present disclosure.

(1) Positive Electrode

The positive electrode may be prepared by coating a positive electrode collector with a positive electrode material mixture slurry including a positive electrode active material, a binder, a conductive agent, and a solvent.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium metal oxide including lithium and at least one metal such as cobalt, manganese, nickel, or aluminum. More specifically, the lithium metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), etc.), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_pCo_qMn_r)O_2$ (where $0<p<1$, $0<q<1$, $0<r<1$, and $p+q+r=1$) or $Li(Ni_{p1}Co_{q1}Mn_{r1})O_4$ (where $0<p1<2$, $0<q1<2$, $0<r1<2$, and $p1+q1+r1=2$), etc.), or lithium-nickel-cobalt-transition metal (M) oxide (e.g., $Li(Ni_{p2}Co_{q2}Mn_{r2}M_{s2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r2, and s2 are atomic fractions of each independent elements, wherein 0<p2<1, 0<q2<1, 0<r2<1, 0<S2<1, and p2+q2+r2+S2=1), etc.), and any one thereof or a compound of two or more thereof may be included.

Among these materials, in terms of the improvement of capacity characteristics and stability of the battery, the lithium metal oxide may be $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, and $Li(Ni_{0.6}Mn_{0.1}Co_{0.1})O_2$, etc.), lithium nickel cobalt aluminum oxide (e.g., $Li(Ni_{0.8}Co_{0.15}Al_{0.05})O_2$, etc.), or lithium nickel manganese cobalt aluminum oxide (e.g., $Li(Ni_{0.86}Co_{0.05}Mn_{0.07}Al_{0.02})O_2$), and any one thereof or a mixture of two or more thereof may be used.

Among them, in terms of the fact that the capacity characteristics of the battery may be most improved, a positive electrode active material having a nickel content of 80 atm % or more may be used. For example, the lithium transition metal oxide may include one represented by [Formula 2] below.

$$Li_xNi_aCo_bM^1_cM^2_dO_2 \quad \text{[Formula 2]}$$

In Formula 2, $M^1$ is at least one of manganese (Mn) or aluminum (Al), and may be preferably Mn or a combination of Mn and Al.

$M^2$ may be at least one selected from the group consisting of zirconium (Zr), tungsten (W), yttrium (Y), barium (Ba), calcium (Ca), titanium (Ti), magnesium (Mg), tantalum (Ta), and niobium (Nb).

x represents an atomic fraction of lithium in the lithium transition metal oxide, wherein x may satisfy $0.90 \le x \le 1.1$, may preferably satisfy $0.95 \le x \le 1.08$, and may more preferably satisfy $1.0 \le x \le 1.08$.

a represents an atomic fraction of nickel among metallic elements excluding lithium in the lithium transition metal oxide, wherein a may satisfy $0.80 \le a < 1.0$, may preferably satisfy $0.80 \le a \le 0.95$, and may more preferably satisfy $0.80 \le a \le 0.90$. In a case in which the amount of the nickel satisfies the above range, high capacity characteristics may be achieved.

b represents an atomic fraction of cobalt among the metallic elements excluding lithium in the lithium transition metal oxide, wherein b may satisfy $0<b<0.2$, $0<b \le 0.15$, or $0.01 \le b \le 0.10$.

c represents an atomic fraction of $M^1$ among the metallic elements excluding lithium in the lithium transition metal oxide, wherein c may satisfy $0<c<0.2$, $0<c \le 0.15$, or $0.01 \le c \le 0.10$.

d represents an atomic fraction of $M^2$ among the metallic elements excluding lithium in the lithium transition metal oxide, wherein d may satisfy $0 \le d \le 0.1$ or $0 \le d \le 0.05$.

The positive electrode active material may be included in an amount of 60 wt % to 99 wt %, preferably 70 wt % to 99 wt %, and more preferably 80 wt % to 98 wt % based on a total weight of a solid content excluding the solvent in the positive electrode material mixture slurry.

The binder is a component that assists in the binding between the active material and the conductive agent and in the binding with the current collector.

Examples of the binder may be polyvinylidene fluoride, polyvinyl alcohol, carboxymethylcellulose (CMC), starch, hydroxypropylcellulose, regenerated cellulose, polyvinylpyrrolidone, polytetrafluoroethylene, polyethylene (PE), polypropylene, an ethylene-propylene-diene monomer, a sulfonated ethylene-propylene-diene monomer, a styrene-butadiene rubber, a fluoro rubber, or various copolymers.

The binder may commonly be included in an amount of 1 wt % to 20 wt %, preferably 1 wt % to 15 wt %, and more preferably 1 wt % to 10 wt % based on the total weight of the solid content excluding the solvent in the positive electrode material mixture slurry.

The conductive agent is a component for further improving conductivity of the positive electrode active material, wherein it may be added in an amount of 1 wt % to 20 wt % based on the total weight of the solid content in the positive electrode material mixture slurry. The conductive agent is not particularly limited as long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; fluorocarbon powder; conductive powder such as aluminum powder or nickel powder; conductive whiskers such as zinc oxide whiskers or potassium titanate whiskers; conductive metal oxide such as titanium oxide; or polyphenylene derivatives, may be used.

The conductive agent may commonly be included in an amount of 1 wt % to 20 wt %, preferably 1 wt % to 15 wt %, and more preferably 1 wt % to 10 wt % based on the total weight of the solid content excluding the solvent in the positive electrode material mixture slurry.

The solvent may include an organic solvent, such as N-methyl-2-pyrrolidone (NMP), and may be used in an amount such that desirable viscosity is obtained when the positive electrode active material as well as optionally the binder and the conductive agent is included. For example, the solvent may be included in an amount such that a concentration of the solid content including the positive electrode active material as well as optionally the binder and the conductive agent is in a range of 50 wt % to 95 wt %, preferably 70 wt % to 95 wt %, and more preferably 70 wt % to 90 wt %.

(2) Negative Electrode

The negative electrode, for example, may be prepared by coating a negative electrode material mixture slurry including a negative electrode active material, a binder, a conductive agent, and a solvent on a negative electrode collector, or a graphite electrode formed of carbon (C) or a metal itself may be used as the negative electrode.

For example, in a case in which the negative electrode is prepared by coating the negative electrode material mixture slurry on the negative electrode collector, the negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

A negative electrode active material layer, which is prepared by being coated on the negative electrode collector, may include $SiO_x$ ($0 \le x<2$), that is, Si or $SiO_x$ ($0 \le x<2$) based on the total negative electrode active material layer. Also, the negative electrode active material layer may include 10 wt % or more of $SiO_x$ ($0 \leq x < 2$), preferably 10 wt % to 20 wt % of $SiO_x$ ($0 \leq x < 2$), and more preferably 10 wt % to 15 wt % of $SiO_x$ ($0 \leq x < 2$) based on a total weight of the negative electrode active material layer. In a case in which an amount of $SiO_x$ ($0 \leq x < 2$) satisfies the above range, a large-capacity lithium secondary battery may be prepared.

In the negative electrode active material, a compound capable of reversibly intercalating and deintercalating lithium may be used as an additional negative electrode active material.

The negative electrode active material may include at least one of lithium metal, a carbon material capable of reversibly intercalating/deintercalating lithium ions, metal or an alloy of lithium and the metal, a metal composite oxide, a material which may be doped and undoped with lithium, or a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), Mg, calcium (Ca), strontium (Sr), silicon (Si), antimony (Sb), lead (Pb), indium (In), zinc (Zn), Ba, radium (Ra), germanium (Ge), Al, and tin (Sn) or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ ($0 \leq x \leq 1$), $Li_xWO_2$ ($0 \leq x \leq 1$), and $Sn_xMe_{1-x}Me'_yO_z$ (Me: Mn, Fe, Pb, or Ge; Me': Al, boron (B), phosphorus (P), Si, Groups I, II and III elements of the periodic table, or halogen; $0 < x \leq 1$; $1 \leq y \leq 3$; $1 \leq z \leq 8$) may be used as the metal composite oxide.

The material, which may be doped and undoped with lithium, may include a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), Y, Ti, Zr, hafnium (Hf), rutherfordium (Rf), V, niobium (Nb), Ta, dubnium (Db), Cr, Mo, W, seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 60 wt % to 99 wt %, preferably 70 wt % to 99 wt %, and more preferably 80 wt % to 98 wt % based on a total weight of solid content in the negative electrode material mixture slurry.

The binder is a component that assists in the binding between the conductive agent, the active material, and the current collector. Examples of the binder may be polyvinylidene fluoride (PVDF), polyvinyl alcohol, carboxymethylcellulose (CMC), starch, hydroxypropylcellulose, regenerated cellulose, polyvinylpyrrolidone, polytetrafluoroethylene, polyethylene, polypropylene, an ethylene-propylene-diene monomer, a sulfonated ethylene-propylene-diene monomer, a styrene-butadiene rubber, a fluoro rubber, or various copolymers thereof.

The binder may be commonly included in an amount of 1 wt % to 20 wt %, preferably 1 wt % to 15 wt %, and more preferably 1 wt % to 10 wt % based on the total weight of the solid content excluding the solvent in the negative electrode material mixture slurry.

The conductive agent is a component for further improving conductivity of the negative electrode active material, wherein the conductive agent may be added in an amount of 1 wt % to 20 wt % based on the total weight of the solid content in the negative electrode material mixture slurry. The conductive agent is not particularly limited as long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; fluorocarbon powder; conductive powder such as aluminum powder or nickel powder; conductive whiskers such as zinc oxide whiskers or potassium titanate whiskers; conductive metal oxide such as titanium oxide; or polyphenylene derivatives, may be used.

The conductive agent may be included in an amount of 1 wt % to 20 wt %, preferably 1 wt % to 15 wt %, and more preferably 1 wt % to 10 wt % based on the total weight of the solid content excluding the solvent in the negative electrode material mixture slurry.

The solvent may include water or an organic solvent, such as NMP (N-methyl-2-pyrrolidone), and may be used in an amount such that desirable viscosity is obtained when the negative electrode active material as well as optionally the binder and the conductive agent is included. For example, the solvent may be included in an amount such that a concentration of the solid content including the negative electrode active material as well as optionally the binder and the conductive agent is in a range of 50 wt % to 95 wt %, preferably, 70 wt % to 90 wt %.

In a case in which the metal itself is used as the negative electrode, the negative electrode may be a metal thin film itself or may be prepared by a method in which the metal is physically bonded, rolled, or deposited on the negative electrode collector. As the deposition method, an electrical deposition method or a chemical vapor deposition method for the metal may be used.

For example, the metal thin film itself or the metal to be bonded/rolled/deposited on the negative electrode collector may include one type of metal selected from the group consisting of lithium (Li), nickel (Ni), tin (Sn), copper (Cu), and indium (In) or an alloy of two types of metals.

(3) Separator

Also, a conventional porous polymer film typically used as a separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator, and a typical porous nonwoven fabric, for example, a nonwoven fabric formed of high melting point glass fibers or polyethylene terephthalate fibers may be used, but the present disclosure is not limited thereto. Furthermore, a coated separator including a ceramic component or a polymer material may be used to secure heat resistance or mechanical strength, and the separator having a single layer or multilayer structure may be optionally used.

A shape of the lithium secondary battery of the present disclosure is not particularly limited, but a cylindrical type using a can, a prismatic type, a pouch type, or a coin type may be used.

Hereinafter, the present invention will be described in detail, according to specific examples. However, the following examples are merely presented to exemplify the present invention, and the scope of the present invention is not limited thereto. It will be apparent to those skilled in the art that various modifications and alterations are possible within the scope and technical spirit of the present invention, and such modifications and alterations fall within the scope of claims included herein.

EXAMPLES

Example 1

(Preparation of Non-Aqueous Electrolyte)

A non-aqueous solvent was prepared by mixing the compound of Formula 1a and ethyl methyl carbonate (EMC) at a volume ratio of 30:70. A non-aqueous electrolyte was prepared by dissolving 1 M $LiPF_6$, 0.5 wt % of vinylene carbonate (VC), 0.5 wt % of 1,3-propane sultone (PS), and 1 wt % of ethylene sulfate (Esa) in the non-aqueous solvent. The compound of Formula 1a was included in an amount of 33 wt % based on the total non-aqueous electrolyte.

[Formula 1a]

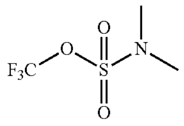

(Lithium Secondary Battery Preparation)

A positive electrode active material ($LiNi_{0.86}Co_{0.05}Mn_{0.07}Al_{0.02}O_2$):a conductive agent (carbon black):a binder (polyvinylidene fluoride) were added in a weight ratio of 97.5:1.0:1.5 to N-methyl-2-pyrrolidone (NMP), as a solvent, to prepare a positive electrode slurry (solid content 50 wt %). One surface of a 12 μm thick positive electrode collector (Al thin film) was coated with the positive electrode slurry, dried, and roll-pressed to prepare a positive electrode.

A negative electrode active material (artificial graphite: SiO=95:5 weight ratio):a conductive agent (carbon black):a binder (SBR-CMC) were added to N-methyl-2-pyrrolidone (NMP), as a solvent, in a weight ratio of 95:1.5:3.5 to prepare a negative electrode slurry (solid content 60 wt %). One surface of a 6 μm thick negative electrode collector (Cu thin film) was coated with the negative electrode slurry, dried, and roll-pressed to prepare a negative electrode.

After disposing a polyolefin-based porous separator coated with $Al_2O_3$ inorganic particles between the above-prepared positive electrode and negative electrode in a dry room, a secondary battery was prepared by injecting the above-prepared non-aqueous electrolyte.

Example 2

A secondary battery was prepared in the same manner as in Example 1 except that a non-aqueous solvent, which was prepared by mixing the compound of Formula 1a and ethyl methyl carbonate (EMC) at a volume ratio of 40:60, was used. The compound of Formula 1a was included in an amount of 42 wt % based on the total non-aqueous electrolyte.

Comparative Example 1

A secondary battery was prepared in the same manner as in Example 1 except that a non-aqueous solvent, which was prepared by mixing ethylene carbonate (EC) and ethyl methyl carbonate (EMC) at a volume ratio of 30:70, was used.

Comparative Example 2

A secondary battery was prepared in the same manner as in Example 1 except that a non-aqueous solvent, which was prepared by mixing a compound of Formula A below and ethyl methyl carbonate (EMC) at a volume ratio of 30:70, was used.

[Formula A]

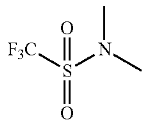

Comparative Example 3

A secondary battery was prepared in the same manner as in Example 1 except that a non-aqueous solvent, which was prepared by mixing the compound of Formula 1a and ethyl methyl carbonate (EMC) at a volume ratio of 15:85, was used. The compound of Formula 1a was included in an amount of 20 wt % based on the total non-aqueous electrolyte.

Experimental Example 1—High-temperature Cycle Characteristics Evaluation

Cycle characteristics were evaluated for each of the secondary batteries prepared in Examples 1 and 2 and Comparative Examples 1 to 3.

Specifically, after charging of each of the batteries prepared in Examples 1 and 2 and Comparative Examples 1 to 3 at a constant current of 0.33 C to 4.2 V at 45 °C and discharging of each battery at a constant current of 0.33 C to 3.0 V were set as one cycle and 250 cycles of the charging and discharging were performed, capacity retention relative to initial capacity after 250 cycles was measured. The results thereof are presented in Table 1 below.

TABLE 1

| | Capacity retention (%) |
|---|---|
| Example 1 | 92.7 |
| Example 2 | 95.1 |
| Comparative Example 1 | 63.5 |
| Comparative Example 2 | 72.3 |
| Comparative Example 3 | 81.6 |

As illustrated in Table 1, since Examples 1 and 2 using the additive for a non-aqueous electrolyte of the present disclosure had higher capacity retentions than Comparative Examples 1 and 2 without using the additive, their life characteristics were excellent. Particularly, with respect to the compound A used in the secondary battery of Comparative Example 2, since terminal $CF_3$ was directly connected to a sulfur atom of a sulfonamide group, there was a difference from the compound of Formula 1 of the present application in which terminal $CF_3$ was connected to a sulfur atom of a sulfonamide group through oxygen. —$CF_3$ is a strong electron withdrawing group (EWG), wherein it is considered that it is difficult to be reduced to a form of LiF when it is directly connected to a sulfur atom. In contrast, in a case in which the terminal was present in a form of —$OCF_3$ as in the compound of Formula 1, since it became a weak EWG, a LiF formation reaction was easy and formation of a polymer-inorganic material composite film on the negative electrode was easy, and accordingly, it was considered that capacity retention at high temperature was excellent. With respect to Comparative Example 3, since the amount of the compound represented by Formula 1 was less than 25 wt % based on the total non-aqueous electrolyte, sufficient LiF was not included in the film, and thus, it was considered that an effect of improving durability of the film was reduced.

Experimental Example 2—High-Temperature Storage Characteristics Evaluation

High-temperature storage characteristics were evaluated for each of the secondary batteries prepared in Examples 1 and 2 and Comparative Examples 1 to 3.

Specifically, after fully charging each of the secondary batteries prepared in Examples 1 and 2 and Comparative Examples 1 to 3 to 4.2 V, each secondary battery was stored at 60 °C for 8 weeks.

Before the storage, a volume of the fully-charged secondary battery was measured to set it as an initial volume of the secondary battery.

After 8 weeks, a volume of the stored secondary battery was measured to calculate a volume that had been increased during a storage period of 8 weeks. A percent ratio of the increased volume to the initial volume of the secondary battery was calculated to derive a volume increase rate after 8 weeks. The results thereof are presented in Table 2 below.

TABLE 2

| | Volume increase rate (%) |
|---|---|
| Example 1 | 13.5 |
| Example 2 | 8.2 |
| Comparative Example 1 | 47.5 |
| Comparative Example 2 | 35.8 |
| Comparative Example 3 | 26.8 |

As illustrated in Table 2, since the secondary batteries of Examples 1 and 2 had higher capacity retentions after 8 weeks than the secondary batteries of Comparative Examples 1 and 2, it was confirmed that the secondary batteries of Examples 1 and 2 had stable performance at high temperature. Particularly, with respect to the compound A used in the secondary battery of Comparative Example 2, since the terminal $CF_3$ was directly connected to the sulfur atom of the sulfonamide group, there was a difference from the compound of Formula 1 of the present application in which the terminal $CF_3$ was connected to the sulfur atom of the sulfonamide group through oxygen. —$CF_3$ is a strong electron withdrawing group (EWG), wherein it is considered that it is difficult to be reduced to the form of LiF when it is directly connected to the sulfur atom. In contrast, in a case in which the terminal was present in the form of —$OCF_3$ as in the compound of Formula 1, since it became a weak EWG, the LiF formation reaction was easy and the formation of the polymer-inorganic material composite film on the negative electrode was easy, and accordingly, it was considered that the volume increase rate was excellent during the long-term storage at a high temperature because a side reaction between the negative electrode and the electrolyte solution was suppressed. With respect to Comparative Example 3, since the amount of the compound represented by Formula 1 was less than 25 wt % based on the total non-aqueous electrolyte, sufficient LiF was not included in the film, and thus, it was considered that the effect of improving the durability of the film was reduced.

The invention claimed is:

1. A non-aqueous electrolyte comprising a lithium salt and an organic solvent, wherein the organic solvent comprises a compound represented by Formula 1 in an amount of 25 wt % to 80 wt % based on a total weight of the non-aqueous electrolyte:

[Formula 1]

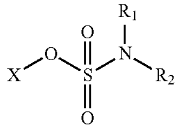

wherein, in Formula 1, $R_1$ and $R_2$ are each independently any one selected from the group consisting of hydrogen (H), an alkyl group having 1 to 10 carbon atoms, an alkenyl group having 2 to 10 carbon atoms, an alkynyl group having 2 to 10 carbon atoms, a cycloalkyl group having 3 to 12 carbon atoms, a cycloalkenyl group having 3 to 12 carbon atoms, and an aryl group having 6 to 20 carbon atoms, and X is a perfluoroalkyl group having 1 to 5 carbon atoms.

2. The non-aqueous electrolyte of claim 1, wherein $R_1$ and $R_2$ are each independently an alkyl group having 1 to 5 carbon atoms.

3. The non-aqueous electrolyte of claim 1, wherein X is $CF_3$ or $CF_2CF_3$.

4. The non-aqueous electrolyte of claim 1, wherein the compound of Formula 1 is any one selected from the group consisting of compounds of Formulae 1a to 1f:

[Formula 1a]

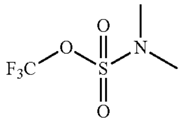

-continued

[Formula 1b]

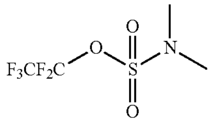

[Formula 1c]

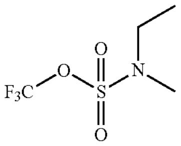

[Formula 1d]

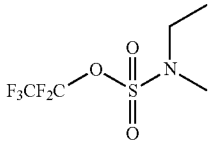

[Formula 1e]

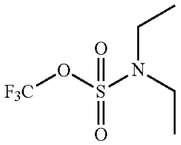

[Formula 1f]

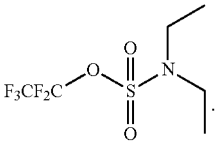

5. The non-aqueous electrolyte of claim 1, wherein the compound represented by Formula 1 is included in an amount of 10 vol % to 50 vol % based on a total volume of the organic solvent.

6. The non-aqueous electrolyte of claim 1, wherein the organic solvent further comprises a linear carbonate compound.

7. The non-aqueous electrolyte of claim 1, wherein the lithium salt is included in a concentration of 0.5 M to 5.0 M.

8. The non-aqueous electrolyte of claim 1, wherein the lithium salt is at least one selected from the group consisting of LiCl, LiBr, LiI, $LiBF_4$, $LiClO_4$, $LiB_{10}Cl_{10}$, $LiAlCl_4$, $LiAlO_2$, $LiPF_6$, $LiCF_3SO_3$, $LiCH_3CO_2$, $LiCF_3CO_2$, $LiAsF_6$, $LiSbF_6$, $LiCH_3SO_3$, $LiN(SO_2F)_2$, $LiN(SO_2CF_2CF_3)_2$, and $LiN(SO_2CF_3)_2$.

9. The non-aqueous electrolyte of claim 1, further comprising at least one of a cyclic carbonate-based compound, a halogen-substituted carbonate-based compound, a sultone-based compound, a sulfate-based compound, a phosphate-based compound, a borate-based compound, a nitrile-based compound, a benzene-based compound, an amine-based compound, a silane-based compound, or a lithium salt-based compound as an additive.

10. A lithium secondary battery comprising:

a positive electrode including a positive electrode active material layer;

a negative electrode including a negative electrode active material layer; and the non-aqueous electrolyte of claim 1.

11. The lithium secondary battery of claim 10, wherein the positive electrode active material layer comprises a positive electrode active material comprising a lithium nickel-based oxide represented by Formula 2:

$Li_xNi_aCo_bM^1_cM^2_dO_2$ [Formula 2]

wherein, in Formula 2, $M^1$ is manganese (Mn), aluminum (Al), or a combination thereof, $M^2$ is at least one selected from the group consisting of zirconium (Zr), tungsten (W), yttrium (Y), barium (Ba), calcium (Ca), titanium (Ti), magnesium (Mg), tantalum (Ta), and niobium (Nb), and $0.90 \leq x \leq 1.1$, $0.80 \leq a < 1.0$, $0 < b < 0.2$, $0 < c < 0.2$, and $0 \leq d \leq 0.1$.

12. The lithium secondary battery of claim 10, wherein the negative electrode active material layer comprises a negative electrode active material comprising $SiO_x$ ($0 \leq x < 2$).

13. The non-aqueous electrolyte of claim 6, wherein the linear carbonate compound is at least one selected from the group consisting of dimethyl carbonate (DMC), diethyl carbonate (DEC), dipropyl carbonate, ethyl methyl carbonate (EMC), methylpropyl carbonate, and ethylpropyl carbonate.

* * * * *